United States Patent
Meguro

(10) Patent No.: US 6,784,716 B2
(45) Date of Patent: Aug. 31, 2004

(54) CLOCK GENERATION CIRCUIT AND CLOCK CONVERSION CIRCUIT

(75) Inventor: Tetsumasa Meguro, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 10/429,715

(22) Filed: May 6, 2003

(65) Prior Publication Data

US 2004/0000939 A1 Jan. 1, 2004

(30) Foreign Application Priority Data

May 14, 2002 (JP) ........................................ 2002-138020

(51) Int. Cl.⁷ ................................................ G06F 1/04

(52) U.S. Cl. ........................ 327/298; 327/299; 377/39; 713/601

(58) Field of Search ................................. 327/291–294, 327/298, 299; 977/28, 33, 39, 51; 713/500–503, 600, 601

(56) References Cited

U.S. PATENT DOCUMENTS

| | | | | |
|---|---|---|---|---|
| 4,989,223 A | * | 1/1991 | Katayose et al. | 377/39 |
| 6,021,506 A | * | 2/2000 | Cho et al. | 713/601 |
| 6,316,982 B1 | * | 11/2001 | Gutierrez, Jr. | 327/298 |
| 6,326,823 B1 | * | 12/2001 | Okui | 327/160 |
| 6,480,589 B1 | * | 11/2002 | Lee et al. | 379/142.04 |
| 6,624,681 B1 | * | 9/2003 | Loyer et al. | 327/297 |

* cited by examiner

*Primary Examiner*—Minh Nguyen
(74) *Attorney, Agent, or Firm*—Rader, Fishman & Grauer PLLC; Ronald P. Kananen

(57) ABSTRACT

A clock generation circuit for generating clocks having a plurality of frequencies by which a suitable frequency for each task can be supplied such that the power consumption is reduced. A clock generation unit is provided for generating a clock with a constant frequency, with a counter operating in synchronization with the clock for counting pulses of the clock, a comparator for comparing a counter value of the counter with the number of pulses of a clock having a desired frequency, and an output gate for controlling the supply and stopping of pulses of the clock input from the clock generation unit based on a comparison result of the comparator.

9 Claims, 12 Drawing Sheets

FIG. 2

| CLOCK FREQUENCY | COMPARISON VALUE OF COUNTER 13 (maxd) | COMPARISON VALUE OF COMPARATOR 14 (cmpd) |
|---|---|---|
| 32MHz | 32 | 32-freq |
| 24MHz | 24 | 24-freq |
| 16MHz | 16 | 16-freq |
| 12MHz | 12 | 12-freq |
| 8MHz | 8 | 8-freq |
| 4MHz | 4 | 4-freq |

FIG. 5

| CLOCK FREQUENCY | COMPARISON VALUE OF COUNTER 13 (maxd) | CONVERSION FORMULA OF CONVERSION CIRCUIT 21 (format) | COMPARISON VALUE OF COMPARATOR 14 (cmpd) |
|---|---|---|---|
| 32MHz | 32 | (a,b,c,d,e) →(e,d,c,b,a) | 32-freq |
| 24MHz | 24 | (a,b,c,d,e) →(a,d,e,d,c) | 24-freq |
| 16MHz | 16 | (a,b,c,d,e) →(a,e,d,c,b) | 16-freq |
| 12MHz | 12 | (a,b,c,d,e) →(a,b,c,e,d) | 12-freq |
| 8MHz | 8 | (a,b,c,d,e) →(a,b,e,d,c,) | 8-freq |
| 4MHz | 4 | (a,b,c,d,e) →(a,b,c,e,d) | 4-freq |

FIG. 6A CLOCK(clk)
FIG. 6B COUNTER VALUE OF COUNTER 13
FIG. 6C OUTPUT OF CONVERSION CIRCUIT 21
FIG. 6D OUTPUT OF COMPARATOR 14 (cken)
FIG. 6E OUTPUT CLOCK (clk_out)

FIG. 8

| CLOCK FREQUENCY | COMPARISON VALUE OF COUNTER 31 (maxd1) | COMPARISON VALUE OF COUNTER 32 (maxd2) | COMPARISON VALUE OF COMPARATOR 33(cmpd) |
|---|---|---|---|
| 32MHz | 4 | 8 | 32-freq |
| 24MHz | 3 | 8 | 24-freq |
| 16MHz | 4 | 4 | 16-freq |
| 12MHz | 3 | 4 | 12-freq |
| 8MHz | 2 | 4 | 8-freq |
| 4MHz | 1 | 4 | 4-freq |

FIG. 9A CLOCK(clk)
FIG. 9B COUNTER VALUE OF COUNTER 31
FIG. 9C OUTPUT OF COUNTER 31 (overflow)
FIG. 9D OUTPUT OF COUNTER 32
FIG. 9E OUTPUT OF COMPARATOR 33 (cken)
FIG. 9F OUTPUT CLOCK (clk_out)

FIG. 11

| CLOCK FREQUENCY | COMPARISON VALUE OF COUNTER 31 (maxd1) | COMPARISON VALUE OF COUNTER 32 (maxd2) | CONVERSION FORMULA OF CONVERSION CIRCUIT 41(format) | COMPARISON VALUE OF COMPARATOR 33(cmpd) |
|---|---|---|---|---|
| 32MHz | 4 | 8 | (a,b,c)→(c,b,a) | 32-freq |
| 24MHz | 3 | 8 | (a,b,c)→(c,b,a) | 24-freq |
| 16MHz | 4 | 4 | (a,b,c)→(a,c,b) | 16-freq |
| 12MHz | 3 | 4 | (a,b,c)→(a,c,b) | 12-freq |
| 8MHz | 2 | 4 | (a,b,c)→(a,c,b) | 8-freq |
| 4MHz | 1 | 4 | (a,b,c)→(a,c,b) | 4-freq |

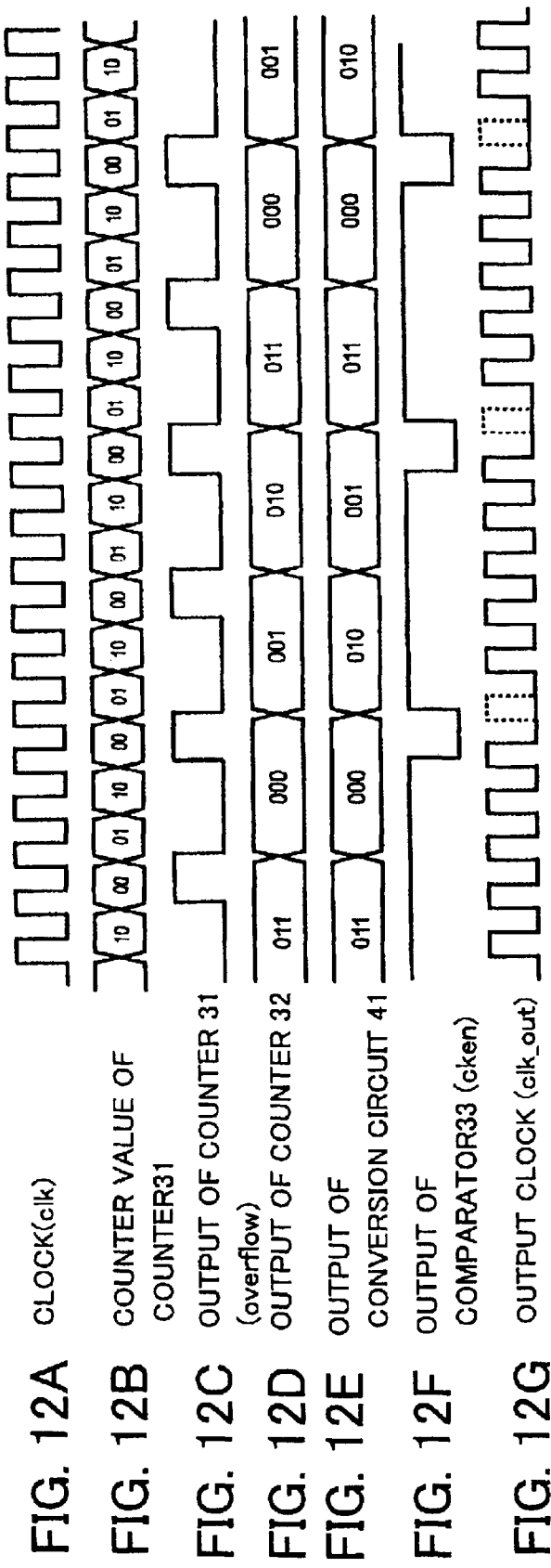

CLOCK GENERATION CIRCUIT AND CLOCK CONVERSION CIRCUIT

BACKGROUND OF THE INVENTION

1. Field of the Invention

The present invention relates to a clock generation circuit for generating a clock having a multi-level frequency suitable to a frequency demanded by a system or an apparatus, etc. operating in synchronization with a clock, and a clock conversion circuit.

2. Description of the Related Art

Power consumption in a system or an electronic apparatus having installed therein an electronic circuit is proportional to a frequency of a clock for driving the system or the apparatus. In many systems or electronic apparatuses of the related art installed with an electronic circuit, however, a frequency of a clock to be supplied is determined in accordance with a task to be processed at the highest speed among required tasks and a clock having this frequency is always supplied. Accordingly, even when the processing of a required task is light, it is driven with a high frequency clock, and thus, there is a disadvantage that the power consumption is always large regardless of the tasks.

To deal with this disadvantage, there has been a technique of preparing a plurality of clocks in advance and switching the clock in accordance with the processing speed of each task when there are tasks requiring heavy processing and when there are tasks requiring light processing, particularly in a portable electronic apparatus, etc., which require a reduction of excessive power consumption.

In this technique, however, only the previously prepared kinds of frequency clocks can be supplied. A required minimum frequency differs in a variety of tasks, so the current frequency switching technique does not completely suit the required minimum frequencies of the variety of tasks. For example, when switching a frequency between 50 MHz and 100 MHz, a clock of 50 MHz is sufficient for tasks operating at 50 MHz at a minimum, but when a task operating at a clock of, for example, 80 MHz at a minimum interrupts, the operating frequency of the whole system or apparatus is switched to 100 MHz. Consequently, the clock becomes excessively higher by 20 MHz than what is required and power is wasted by that amount in terms of power consumption.

To prevent this disadvantage, a supply of frequencies having more gradual multi-levels has to be realized in order to cover the minimum operation frequencies of all assumed tasks. However, it is impossible to cover the minimum operation frequencies of all tasks in a system or electronic apparatus wherein circuits operate in a complicated manner. Even when it is realized, a load on a clock generation circuit becomes heavy because of the requirement that many kinds of frequency clocks be prepared in advance.

Accordingly, the clock frequencies are switched by rough divisions, such as at the time of driving with batteries or an AC power source, or at the time a high-speed clock is required, and excessive power consumption due to the incongruity of frequencies is permitted to a certain extent in many cases.

SUMMARY OF THE INVENTION

An object of the present invention is to provide a clock generation circuit including a configuration wherein excessive power consumption is reduced as much as possible while using a clock generated at a certain cycle, and a clock conversion circuit.

According to a first aspect of the present invention, there is provided a clock generation circuit, comprising a clock generation unit for generating a clock with a constant frequency; a counter operating in synchronization with the clock for counting pulses of the clock; a comparator for comparing a counter value of the counter with the number of pulses of a clock having a desired frequency; and an output gate for controlling the supply and stopping of pulses of the clock input from the clock generation unit based on a comparison result of the comparator.

The clock conversion circuit according to the first aspect of the present invention comprises a counter operating in synchronization with an input clock for counting pulses of the clock; a comparator for comparing a counter value of the counter with the number of pulses of a clock having a desired frequency; and an output gate for controlling the supply and stopping of pulses of the input clock based on a comparison result of the comparator.

In the first aspect, when the clock generation unit generates a clock with a constant frequency or a clock with the constant frequency is input from the outside, the clock is supplied to the counter and the output gate. The counter counts pulses thereof in synchronization with the clock. The comparator monitors a counter value of the counter and compares the value with the number of pulses of a clock having a desired frequency. The output gate controls the supply and stopping of pulses of the input clock. Since the control is performed based on a comparison result of the comparator, the input clock is adjusted to have the number of pulses equivalent to a desired frequency per same unit of time and output from the output gate.

According to a second aspect of the present invention, there is provided a clock generation circuit, comprising a clock generation unit for generating a clock with a constant frequency; a counter operating in synchronization with the clock for counting pulses of the clock; a conversion circuit for performing data conversion on the counter value of the counter and outputting the same; a comparator for comparing an output value of the conversion circuit with the number of pulses of a clock having a desired frequency; and an output gate for controlling the supply and stopping of pulses of the clock input from the clock generation unit based on a comparison result of the comparator.

A clock conversion circuit according to the second aspect of the present invention comprises a counter operating in synchronization with an input clock for counting pulses of the clock; a conversion circuit for performing data conversion on a counter value of the counter and outputting the same; a comparator for comparing an output value of the conversion circuit with the number of pulses of a clock having a desired frequency; and an output gate for controlling the supply and stopping of pulses of the input clock based on a comparison result of the comparator.

In the second aspect, a counter, comparator and output gate having the same functions as those in the first aspect are provided and a conversion circuit is furthermore provided. The conversion circuit performs data conversion of, for example, replacing an arrangement of pulses on a counter value of the counter and outputs the same. The comparator in this case compares an output value of the conversion circuit with the number of pulses of a desired frequency. The output gate for supplying and stopping the pulses based on the comparison result of the comparator outputs, while it depends on the data conversion performed by the conversion circuit, a clock wherein pulse stopping positions are more dispersed than in the case of the first aspect in accordance with conversion when the conversion is, for example, to replace bits.

According to a third aspect of the present invention, there is provided a clock generation circuit, comprising a clock generation unit for generating a clock of a frequency; a first counter for counting in synchronization with the clock; a second counter for counting in synchronization with the clock every time the first counter overflows; a comparator for comparing the counter value of the second counter with a value corresponding to a frequency difference between a frequency of the clock and a desired frequency; and an output gate for controlling the supply and stopping of pulses of the clock based on a comparison result of the comparator and outputting a clock wherein the frequency difference is corrected.

A clock conversion circuit according to the third aspect of the present invention comprises a first counter for counting in synchronization with an input clock; a second counter for counting in synchronization with the clock every time the first counter overflows; a comparator for comparing a counter value of the second counter with a value corresponding to a frequency difference between a frequency of the clock and a desired frequency; and an output gate for controlling the supply and stopping of pulses of the clock based on a comparison result of the comparator and outputting a clock wherein the frequency difference is corrected.

In the third aspect, a plurality of counters, two in this case, for operating to count in synchronization with the input clock are provided. The second counter of the two operates to count every time the first counter overflows. The comparator compares the counter value of the second counter with a value corresponding to a frequency difference between a frequency of the clock and a desired frequency every time the first counter overflows. The output gate controls the supply or stopping of pulses of the clock based on the comparison result of the comparator, so a clock wherein the above frequency difference is corrected is output from the output gate.

According to a fourth aspect of the present invention, there is provided a clock generation circuit, comprising a clock generation unit for generating a clock with a constant frequency; a first counter for counting in synchronization with the clock; a second counter for counting in synchronization with the clock every time the first counter overflows; a conversion circuit for performing data conversion on a counter value of the second counter and outputting the same; a comparator for comparing an output value of the conversion circuit with a value corresponding to a frequency difference between a frequency of the clock and a desired frequency every time the first counter overflows; and an output gate for controlling the supply and stopping of pulses of the clock based on comparison results of the comparator and outputting a clock wherein the frequency difference is corrected.

A conversion circuit according to the fourth aspect of the present invention comprises a first counter for counting in synchronization with an input clock; a second counter for counting in synchronization with the clock every time the first counter overflows; a conversion circuit for performing data conversion on the counter value of the second counter and outputting the same; a comparator for comparing an output value of the conversion circuit with a value corresponding to a frequency difference between a frequency of the clock and a desired frequency; and an output gate for controlling the supply and stopping of pulses of the clock based on a comparison result of the comparator and outputting a clock wherein the frequency difference is corrected.

In the fourth aspect, a conversion circuit in the second aspect is furthermore added to the configuration of the third aspect. The comparator in this case compares an output value of the conversion circuit with a value corresponding to a frequency difference between a frequency of a clock with a desired frequency. When a conversion format of the conversion circuit and the number of bits to be repeatedly counted by the counter are suitably selected, the output gate for outputting the supply and for stopping pulses in accordance with the comparison result outputs a clock having a desired frequency wherein pulse stopping positions are uniformly dispersed as a whole.

BRIEF DESCRIPTION OF THE DRAWINGS

These and other objects and features of the present invention will become clearer from the following description of the preferred embodiments given with reference to the attached drawings, in which:

FIG. 2 is a table of specific examples of comparative values of a counter and a comparator in the clock generation circuit according to the first embodiment;

FIG. 5 is a table of specific examples of comparative values of a counter and a comparator, and conversion formulas of a conversion circuit in the clock generation circuit according to the second embodiment;

FIG. 8 is a table of specific examples of comparative values of first and second counters and a comparator in the clock generation circuit according to the third embodiment;

FIG. 11 is a table of specific examples of comparative values of first and second counters and a comparator, and conversion formulas of a conversion circuit in the clock generation circuit according to the fourth embodiment; and FIG. 12A to FIG. 12G are timing charts showing waveforms of an input/output clock of the output gate, a counter value of the first counter, outputs of the first and second counters, an output of the conversion circuit and an output of a comparator in an operation of the clock generation circuit according to the fourth embodiment.

DESCRIPTION OF THE PREFERRED EMBODIMENTS

Clock generation circuits according to embodiments of the present invention generate a clock having a predetermined frequency and reduce an unnecessary number of pulses by comparing the generated clock frequency with a frequency being in accordance with a required task so as to attain a reduction of power consumption. For this purpose, the clock generation circuits comprise a clock generation unit for generating a clock having a predetermined frequency, a counter operating in synchronization with a clock for counting pulses of the clock, a comparator for comparing the counter value of the counter with the number of pulses of a clock having a desired frequency, and an output gate for controlling the supply and stopping of pulses of the clock input from the clock generation unit based on the comparison result by the comparator.

The above clock to be generated may be one or more than one. A clock output from the clock generation unit may be a high-speed clock itself used as a system clock and may be those generated by dividing a frequency of the high-speed clock when more than one. When the clock generation unit generates a plurality of clocks, it is preferable that a selection circuit for selecting one from them is provided.

In the embodiments of the present invention, to disperse particularl pulse stopping positions of clock pulses as a whole output from the output gate, a form of being provided with a conversion circuit for performing data conversion, for example, of changing an arrangement of pulses of a counter value of the counter or being provided with a plurality of counters, and furthermore, the plurality of counters and a conversion circuit are used in combination, etc. are possible.

Note that clock conversion circuits according to the present invention do not include a clock generation unit itself and are used for example by being connected to an existing clock generation unit. Except that the clock generation unit is not included, the basic configuration is basically the same as that in the above clock generation circuit. Below, the embodiments of the present invention will be explained in more detail by taking a clock generation circuit as an example with reference to the drawings.

First Embodiment

Figure 1:
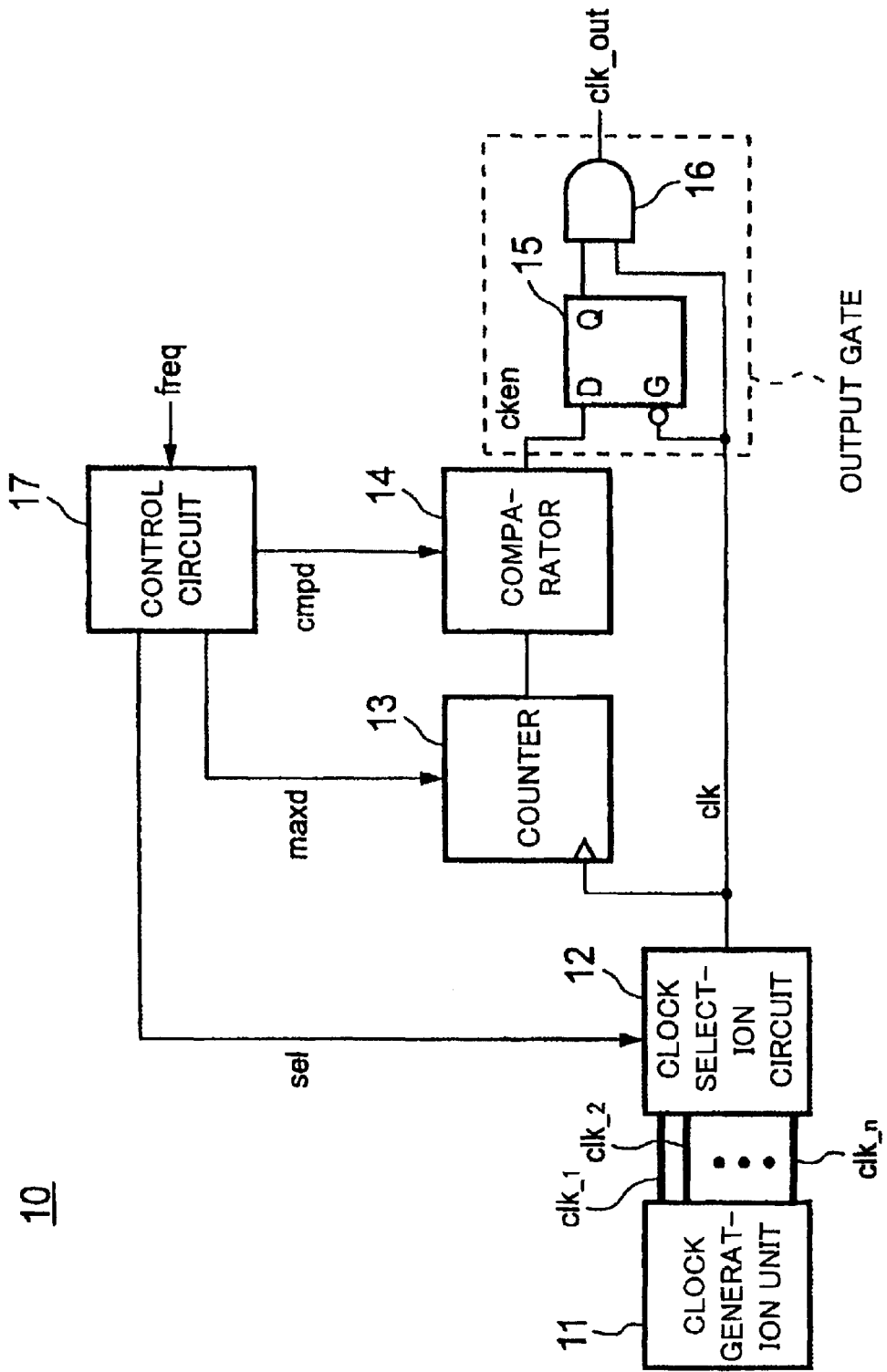
FIG. 1 is a block diagram of the basic configuration of a clock generation circuit according to a first embodiment.

FIG. 1 is a block diagram of the basic configuration of a clock generation circuit according to the first embodiment.

A clock generation circuit 10 comprises a clock generation unit 11, a clock selection circuit 12, a counter 13, a comparator 14, an output gate comparing a latch 15 and an AND gate 16, and a control circuit 17. The control circuit 17 receives as an input a frequency value (freq) of a required clock, calculates a selection signal (sel) for instructing the clock selection circuit 12, a comparison value (maxd) for instructing the counter 13 and a comparison value (cmpd) for instructing the comparator 14 based on the frequency value (freq) and outputs the same.

An output of the clock generation unit 11 is connected to an input of the clock selection circuit 12. The clock generation circuit 11 generates a single clock with a constant frequency or a plurality of clocks clk_1, clk_2, . . . clk_n having different frequencies as shown in FIG. 1, and outputs to the clock selection circuit 12. The clocks clk_1, clk_2, . . . clk_n are clocks having different frequencies, which are clocks obtained by dividing a frequency of a high-speed clock by different frequency dividing ratios in some cases and clocks generated by different oscillators and PLL (Phase Locked Loop) circuits in other cases.

The clock selection circuit 12 is a selector circuit for receiving as an input one or more clocks and selecting a clock based on the selection signal (sel). An output line of the clock selected in the clock selection circuit 12 (hereinafter, referred to as clk) is connected to a clock input of the counter 13, an inverted input G of the latch 15 and one input of the AND gate 16.

The latch 15 and the AND gate 16 compose a latch type clock gating circuit (an output gate). The non-inverted input D of the latch 15 is connected to an output of the comparator 14 and an output Q of the latch 15 is connected to the other input of the AND gate 16. The AND gate 16 outputs a clock (clk_out) wherein electrically excessive pulses are removed. The latch type clock gating circuit configured as above operates in the AND gate 16 to control supplying and stopping of the clock (clk) to be supplied to the inverted input G of the latch 15 in accordance with an enable signal (cken) of a clock output from the comparator 14, and as a result, outputs from the AND gate 16 a clock (clk_out) wherein excessive pulses are removed. In the circuit shown in FIG. 1, a clock pulse is supplied when the enable signal (cken) is at "H", while the clock pulse is stopped when the enable signal (cken) is at "L". Note that in FIG. 1, a latch type clock gating circuit was shown, but other types of clock gating circuits may be also applied.

The comparator 14 compares a comparison value (cmpd) instructed from the control circuit 17 with a counter value of the counter output from the counter 13 and generates an enable signal (cken) of a clock based on the comparison result. The counter 13 is an up counter or a down counter operating in synchronization with a clock (clk) output from the clock selection circuit 12 and repeatedly counting the number of pulses of the clock at a predetermined cycle.

In the case where a plurality of clocks are input to the clock selection circuit 12, when assuming that frequencies of the input clocks clk_1, clk_2, . . . , clk_n are f1, f2, . . . fn (f1<f2<. . . <fn) and a resolution of a clock frequency required by the clock generation circuit 10 is Δf, the comparator 14 is a comparator having a bit length of $\log_2(fn/\Delta f)$ and the counter 13 is a counter having $\log_2(fn/\Delta f)$ bits.

Below, an operation will be explained plainly by taking an example of selecting one out of a plurality of clocks.

When a required frequency value (freq) is given, the control circuit 17 outputs to a clock selection circuit 12 a selection signal (sel) for selecting a clock having a minimum frequency fi (hereinafter, referred to as clk_i) in a range larger than the demanded frequency value (freq) from the frequencies f1, f2, . . . fn of the clocks clk_1, clk_2, . . . clk_n input to the clock selection circuit 12. The control circuit 17 respectively generates fi/Δf as a comparison value (maxd) of the counter 13 and (fi−freq)/Δf as a comparison value (cmpd) of the comparator 14 and outputs the same to the counter 13 and the comparator 14.

As a result, the clock selection circuit 12 selects a clock (clk_i) being in accordance with the desired frequency (freq) indicated by the selection signal (sel). The counter 13 endlessly increments or decrements in synchronization with the clock (clk) the counter value between 0 and (maxd−1) in accordance with the comparative value (maxd) given by the control circuit 17. The comparator 14 compares the counter value of the counter 13 with the comparison value (cmpd) given by the control circuit 17 and sets an enable signal (cken) of the clock to "L" when the counter value of the counter 13 is less than the comparison value (cmpd), and sets it to "H" when the counter value of the counter 13 is not less than the comparison value (cmpd). Note that the relationship of the height of the comparison values and the voltage levels of the enable signal (cken) may be inverse.

Based on the enable signal (cken) of the clock, the latch 15 and the AND gate 16 stop the clock (elk) when the voltage level is at "L", supply the clock (clk) when at "H", and outputs an output clock (clk_out) generated thereby.

FIG. 2 is a table of values of a comparison value (maxd) of the counter 13 and a comparison value (cmpd) of the comparator 14 when a clock of 4 MHz to 32 MHz is input and a frequency having a resolution of 1 MHz is generated.

FIGS. 3A to 3D show waveforms of a clock (clk), a counter value of the counter, an output of the comparator (enable signal (cken)) and an output clock (clk_out) when 10 MHz is required as a desired frequency (freq) in the setup shown in FIG. 2.

Figure 3:
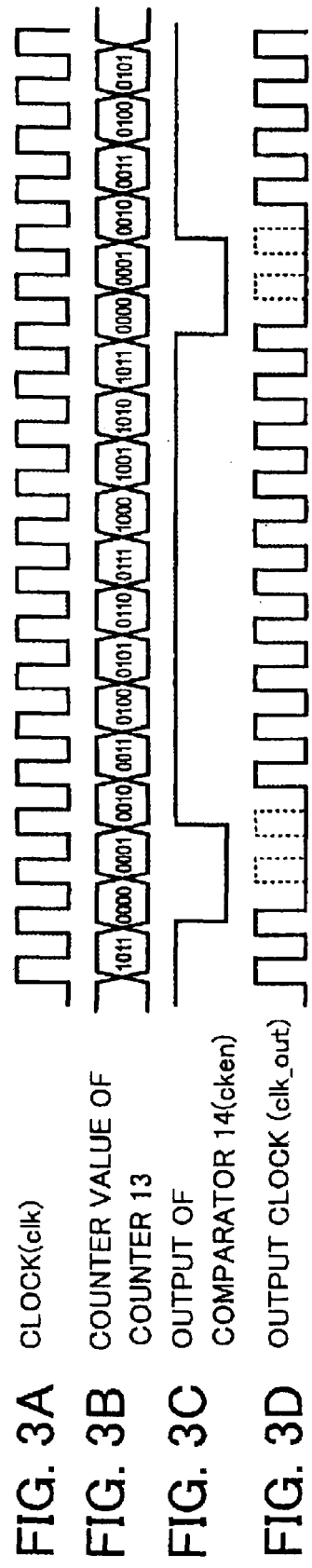
FIG. 3A to FIG. 3D are timing charts showing waveforms of an input/output clock of the output gate, a counter value of the counter and an output of the comparator in an operation of the clock generation circuit according to the first embodiment.

When a frequency of 10 MHz is demanded, the clock (clk_i) of 12 MHz is selected in the clock selection circuit 12 and given as a clock (clk) to the counter 13 and the output gate. The counter 13 operates to count in synchronization with the clock (clk) of 12 MHz. Specifically, when the counter is an up counter, the counter 13 endlessly increments between "0" ("00000" in binary) and "11" ("01011" in binary) as shown in FIG. 3B. The comparator 14 sets the enable signal (cken) of the clock to "L" when an output value of the counter 13 is "0" ("00000" in binary) and "1" ("00001 " in binary) as shown in FIG. 3C. Consequently, the clock (clk_out) to be output becomes a clock having an effective frequency of 10 MHz as a result that two pulses are stopped for every 12 pulses as shown in FIG. 3D.

In the case where a desired frequency (freq) is 10 MHz was explained above, but in the clock generation circuit 10 of the present embodiment, no matter what value the frequency (freq) may be, a closest frequency is selected in a range larger than that to operate the clock generation circuit. As a result the clock is stopped at a ratio in accordance with the frequency difference, and an output clock (clk_out) having an effective frequency equivalent to the desired frequency (freq) can be generated. The power consumption can be suppressed for an amount such that unnecessary clock pulses are not supplied to the system or electronic apparatus using the clock generation circuit 10.

Second Embodiment

The second embodiment is a case of adding a conversion circuit of the counter value of the counter to the clock generation circuit of the first embodiment.

Figure 4:
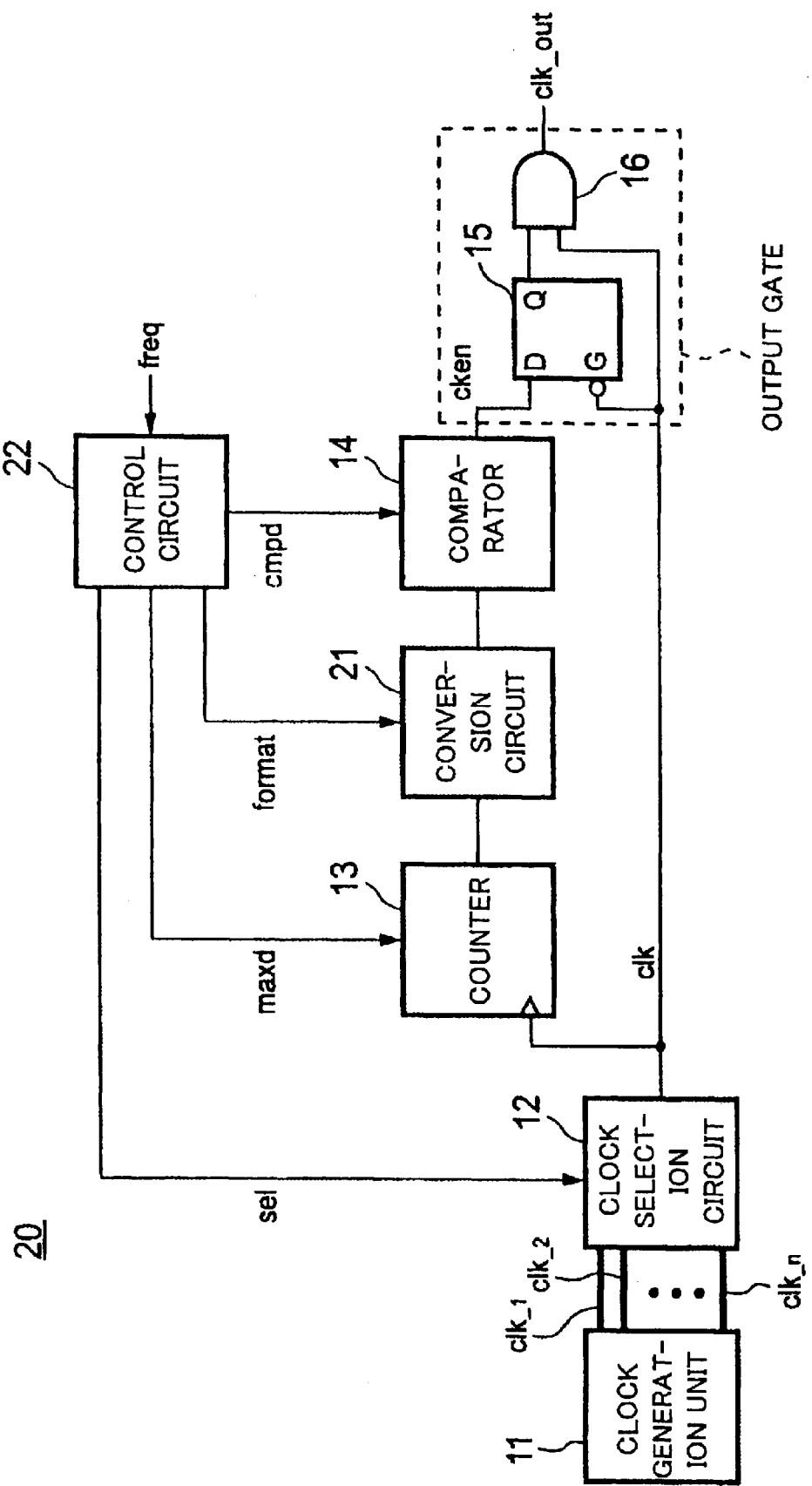
FIG. 4 is a block diagram of the basic configuration of a clock generation circuit according to a second embodiment.

FIG. 4 is a block diagram of the basic configuration of a clock generation circuit according to the second embodiment. Note that the configurations in common with those in the first embodiment are given the same reference numbers and an explanation on the function and connection relationship will be omitted.

The clock generation circuit 20 comprises a conversion circuit 21 of a clock counter value and a control circuit 22 in addition to a clock generation unit 11, a clock selection circuit 12, a counter 13, a comparator 14, and an output gate comprising a latch 15 and an AND gate 16. The control circuit 22 receives as an input a frequency value (freq) of a demanded clock, calculates a selection signal (sel) for instructing to the clock selection circuit 12, a comparison value (maxd) for instructing to the counter 13 and a comparison value (cmpd) for instructing to the comparator 14 based on the frequency value (freq) and instructs conversion regulation, such as a conversion formula "format", to the conversion circuit 21 in a changeable way.

The conversion circuit 21 of the clock counter value is provided between the counter 13 and the comparator 14, performs predetermined data conversion based on the conversion regulation, such as a conversion formula "format", given by the control circuit 22, then, outputs the converted value to the comparator 14. Note that when the conversion regulation, such as a conversion formula, is fixed to a predetermined one, the conversion circuit itself is configured in accordance with the conversion regulation and the conversion regulation itself may be configured to be unable to be changed. In this case, the control circuit 22 may be configured to omit a function of determining the conversion regulation, such as a conversion formula "format", that is, configured to be the same configuration as in the control circuit 17 of the first embodiment.

The comparator 14 compares the comparison value (cmpd) instructed from the control circuit 22 with the converted value of the conversion circuit 21 and generates an enable signal (cken) of the clock based on the comparison result.

In the case where a plurality of clocks are input to the clock selection circuit 12, when assuming that frequencies of the input clocks clk_1, clk_2, ... clk_n are f1, f2, ... fn (f1<f2< ... <fn) and a resolution of a clock frequency demanded to the clock generation circuit 20 is $\Delta f$, the comparator 14 is a comparator having a bit length of $\log_2(fn/\Delta f)$, the counter 13 is a counter having $\log_2(fn/\Delta f)$ bits, and the conversion circuit 21 performs data conversion of $\log_2(fn/\Delta f)$ bits.

Below, an operation will be explained plainly by taking an example of selecting one out of a plurality of clocks.

When the demanded frequency value (freq) is given, the control circuit 22 outputs to the clock selection circuit 12 a selection signal (sel) for selecting a clock (clk_i) having a minimum frequency fi in a range larger than the demanded frequency value (freq) from the frequencies f1, f2, ... fn of the clocks clk_1, clk_2, ... clk_n input to the clock selection circuit 12. The control circuit 22 respectively generates $fi/\Delta f$ as the comparison value (maxd) of the counter 13 and $(fi-freq)/\Delta f$ as the comparison value (cmpd) of the comparator 14 and outputs to the counter 13, the conversion circuit 21 and the comparator 14, respectively.

As a result, the clock selection circuit 12 selects a clock (clk_i) being in accordance with the desired frequency (freq) indicated by the selection signal (sel). The counter 13 endlessly increments or decrements in synchronization with the clock (clk) the counter value between 0 and (maxd−1) in accordance with the comparison value (maxd) given by the control circuit 22. The conversion circuit 21 performs data conversion on the counter value of the counter 13 based on the conversion formula "format" given by the control circuit 22. The data conversion is preferably conversion wherein an input value and an output value are determined to be in one to one correspondence and the maximum value and the minimum value are the same. For example, it is conversion of replacing bits at the lower bit side in binary. The comparator 14 compares the converted value input from the conversion circuit 21 with the comparison value (cmpd) given by the control circuit 22 and sets the enable signal (cken) of the clock to, for example, "L" when the converted value is less than the comparison value (cmpd), and sets it to "H" when the converted value is not less than the comparison value (cmpd). Note that the relationship of the height of the comparison values and the voltage levels of the enable signal (cken) may be inverse.

Based on the enable signal (cken) of the clock, the latch 15 and the AND gate 16 stop the clock (clk) when the voltage level is at "L", supply the clock (clk) when at "H", and output an output clock (clk out) generated thereby.

FIG. 5 is a table of values of a comparison value (maxd) of the counter 13, a conversion formula "format" of the conversion circuit 21 and a comparison value (cmpd) of the comparator 14 when a clock of 4 MHz to 32 MHz is input and a frequency having a resolution of 1 MHz is generated.

As the conversion based on the conversion formula "format", conversion of replacing all bits or any bits on the lower bit side may be adopted, such as conversion of replacing all bits from the uppermost bits to the lowermost bit for example as shown in the row of a clock frequency of 32 MHz in FIG. 5, conversion of replacing bits of the lower four bits for example as shown in the row of a clock frequency of 16 MHz, conversion for replacing bits of the lower three bits for example as shown in the row of a clock frequency of 24MHz and 8 MHz, or conversion of replacing bits of the lower two bits for example as shown in rows of a clock frequency of 12 MHz and 4 MHz. Of course the same conversion formula may be used for all frequencies or different conversion formulas may be used for different frequencies as shown in the table in FIG. 5. Also, the conversion formulas can be suitably changed by the control circuit 22.

FIGS. 6A to 6E show waveforms of a clock (clk), a counter value of the counter, an output of the conversion circuit, an output of the comparator (enable signal (chen)) and an output clock (clk_out) when 10 MHz is demanded as a desired frequency value in the setup in FIG. 5.

Figure 6:
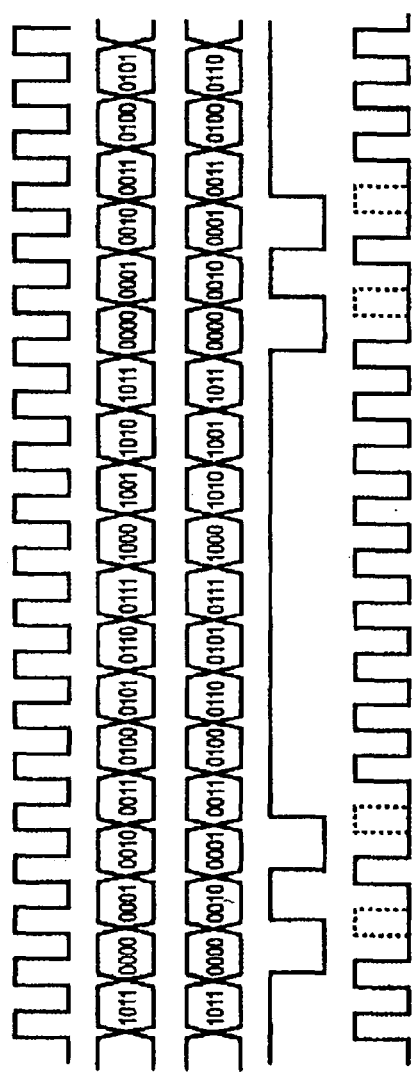
FIG. 6A to FIG. 6E are timing charts showing waveforms of an input/output clock of the output gate, a counter value of the counter, an output of the conversion circuit and an output of the comparator in an operation of the clock generation circuit according to the second embodiment.

For example, when a frequency of 10 MHz is demanded, a clock (clk_i) of 12 MHz is selected in the clock selection circuit 12 and given as a clock (clk) to the counter 13 and the output gate. The counter 13 operates to count in synchronization with the clock (clk) of 12 MHz. Specifically, when the counter is an up counter, the counter 13 endlessly increments between "0" ("00000" in binary) to "11" ("01011" in binary) as shown in FIG. 6B. The conversion circuit 21 converts the binary counter value of the counter 13 in accordance with the data conversion formula "format". In an example in FIG. 6C, bits are replaced in lower two bits in order to not change the maximum value and the minimum value of the input value and output value of the conversion circuit 21. The comparator 14 sets the enable signal (cken) to "L" when an output value of the counter 13 is "0" ("00000" in binary) and "1" ("00001" in binary) as shown in FIG. 6D. Thus, the output (clk_out) becomes a clock having an effective frequency of 10 MHz and, as a result, two pulses are stopped in every 12 pulses as shown in FIG. 6E.

The case where a desired frequency (freq) was 10 MHz was explained above, but in the clock generation circuit 20 of the present embodiment, no matter what value the frequency (freq) may be, a closest frequency is selected in a range larger than that to operate the clock generation circuit. As a result the clock is stopped at a ratio in accordance with the frequency difference, an output clock (clk_out) having an equivalent effective frequency with the desired frequency (freq) can be generated. The power consumption can be suppressed for an amount such that unnecessary clock pulses are not supplied to a system or an electronic apparatus using the clock generation circuit 20.

In the first embodiment, two successive cycles of pulses were omitted in every 12 cycles as shown in FIG. 3D, while, in the second embodiment, one cycle of pulse is supplied between two pulses to be omitted as show in FIG. 6E. In an electronic circuit system operating in synchronization with a clock, power source noise in synchronization with the clock is generated. When a period of being supplied with the clock and a suspended period are completely separated, generation of noise in synchronization with a frequency of the enable signal (cken) of the clock is worrisome. Thus, when omitting some pulses of the clock, generation of noise can be suppressed more when pulses to be omitted are dispersed, so an erroneous operation of the electronic circuit system can be prevented.

Also, cycles of supplying and suspending a clock are repeated for every 12 cycles in the examples shown in FIG. 3D and FIG. 6E, but when a clock frequency to be selected is high and a resolution Δf is small, the cycle becomes very long and it is anticipated that a suspended cycle of a system becomes long. Moreover, it is preferable for an application having real-time characteristics, etc. to always operate at a certain ratio, thus, pulses to be omitted are also preferably dispersed from this viewpoint. The clock generation circuit of the second embodiment is obtained by improving the first embodiment in this viewpoint.

Third Embodiment

In the third embodiment, an example of providing a plurality of counters in the clock generation circuit of the first embodiment will be explained. The number of the counters may be any, but a case of providing two counters will be explained below.

Figure 7:
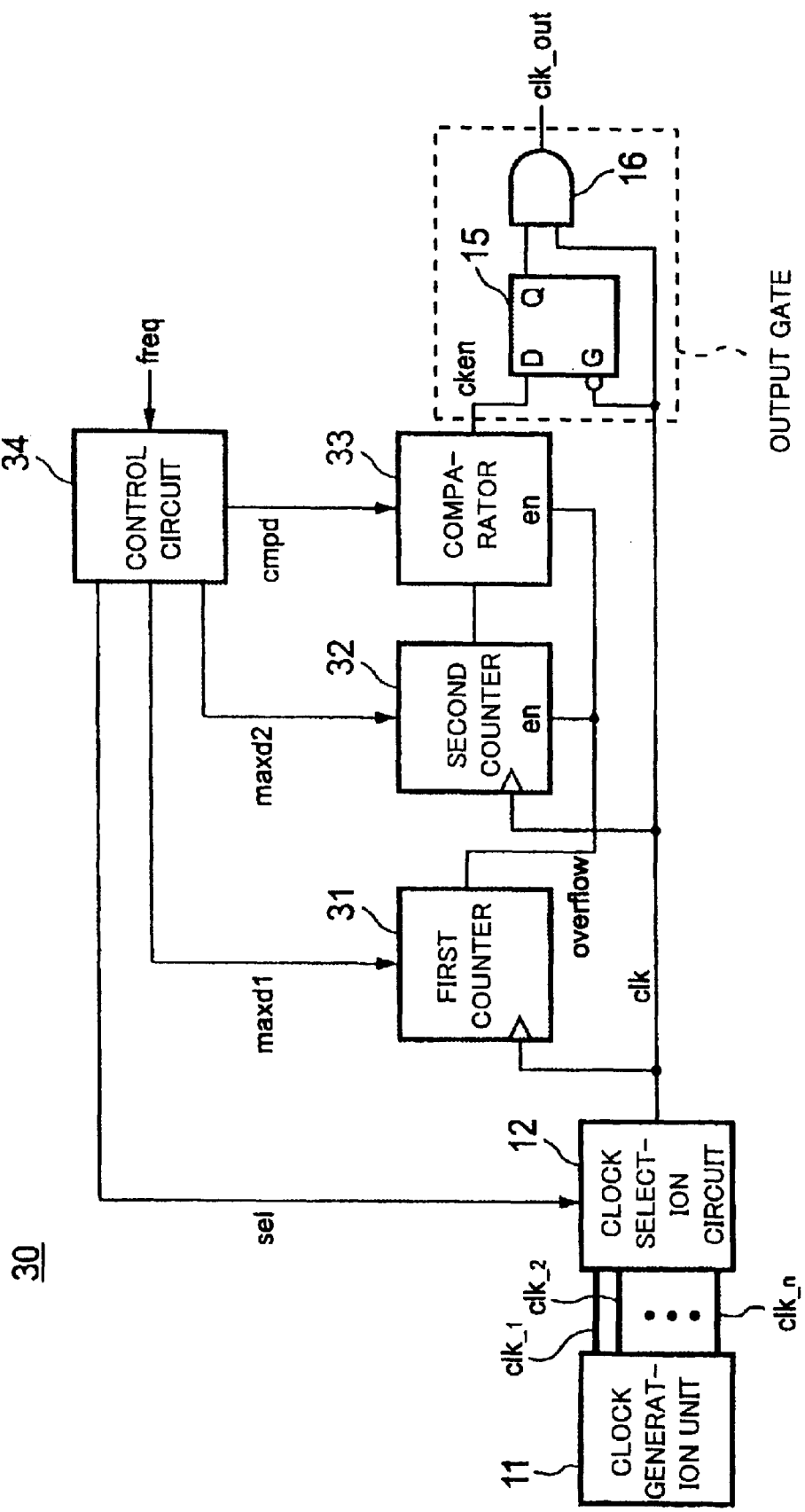
FIG. 7 is a block diagram of the basic configuration of a clock generation circuit according to a third embodiment.

FIG. 7 is a block diagram of the basic configuration of a clock generation circuit according to the third embodiment. Note that the same reference numbers are given to configurations in common with those in the first embodiment and an explanation on functions and connection relationship thereof will be omitted.

The clock generation circuit 30 comprises a first counter 31, a second counter 32, a comparator 33 and a control circuit 34 in addition to a clock generation unit 11, a clock selection circuit 12 and an output gate comprising a latch circuit 15 and an AND gate 16. The control circuit 34 receives as an input a demanded frequency value (freq) of a clock, calculates and outputs a selection signal (sel) for instructing the clock selection circuit 12, a comparison value (maxd1) for instructing the first counter 31, a comparison value (maxd2) for instructing the second counter 32, and a comparison value (cmpd) for instructing to the comparator 33 based on the frequency value (freq).

Clock inputs of the first counter 31 and the second counter 32 are connected to output lines of the clock selection circuit 12 so as to receive as an input a selected clock (clk). An output of the first counter 31 is connected to input terminals (en) of respective enable signals of the second counter 32 and the comparator 33. An output of the second counter 32 is connected to one input of the comparator 33.

The comparator 33 compares the comparison value (cmpd) instructed from the control circuit 34 with a counter value output from the second counter 32 by using a signal "overflow" output from the first counter 31 as an enable signal and generates an enable signal (cken) of a clock based on the comparison result.

The first counter 31 operates in synchronization with the clock (clk) output from the clock selection circuit 12 and is an up counter or a down counter for repeatedly counting the number of pulses of the clock at a predetermined cycle.

The second counter 32 operates to count by using an overflow signal "overflow" from the first counter 31 as an enable signal. Namely, the second counter 32 operates to count only when the overflow signal "overflow" is output from the first counter 31 in synchronization with the clock (clk) output from the clock selection circuit 12 and increments or decrements the counter value.

When a plurality of clocks are input to the clock selection circuit 12, frequencies of the input clocks clk_1, clk_2, ... clk_n are assumed to be f1, f2, ... fn (f1<f2<... <fn), respectively. When a resolution of the clock frequency demanded to the clock generation circuit 30 is $\Delta f$ and a frequency of a clock at the time a frequency difference (fi-(fi-1))of the frequency and that of a clock having a one-level lower frequency becomes maximum is f(max), the comparator 33 is a comparator having a bit length of $\log_2(f(max)-f(max-1)/\Delta f)$, a second counter 32 is a counter having $\log_2(f(max)-f(max-1)/\Delta f)$ bits, and the first counter 31 is a counter having $\log_2(f(max)/f(max)-f(max-1))$ bits.

Below, an operation will be plainly explained by taking an example of selecting one out of a plurality of clocks.

When a demanded frequency value (freq) is given, the control circuit 34 outputs to the clock selection circuit 12 a selection signal (sel) for selecting a clock (clk_i) having a minimum frequency fi in a range larger than the demanded frequency value (freq) from the frequencies f1, f2, ... fn of the clocks clk_1, clk_2, ... clk_n input to the clock selection circuit 12. When assuming that a clock having a one-level lower frequency than that of the clock (clk_i) is clk_j and the frequency is fj, the control circuit 34 respectively generates (fi-fj)/$\Delta f$ as a comparison value (maxd2) of the second counter 32, fi/(fi-fj) as a comparison value (maxd1) of the first counter 31, and (fi-freq)/$\Delta f$ as a comparison value (cmpd) of the comparator 33 and outputs to the second counter 32, the first counter 31 and the comparator 33, respectively.

As a result, the clock selection circuit 12 selects a clock (clk_i) being in accordance with the desired frequency (freq) indicated by the selection signal (sel).

The first counter 31 endlessly increments or decrements in synchronization with the clock (clk) the counter value between 0 and (maxd1-1) in accordance with the comparison value (maxd1) given by the control circuit 34. The first counter 31 supplies a signal "overflow" to the second counter 32 and the comparator 33 every time an overflow occurs.

The second counter 32 endlessly increments or decrements in synchronization with the clock (clk) the counter value between 0 and (maxd2-1) in accordance with the comparison value (maxd2) given by the control circuit 34 by using the output "overflow" of the first counter 31 as an enable signal.

The comparator 33 compares an output value of the second counter 32 with the comparison value (cmpd) by using the output "overflow" of the first counter 31 as an enable signal and sets the enable signal (cken) of the clock to "L" or "H" in accordance with the comparison result. Specifically, for example when the output value of the second counter 32 is less than the comparison value (cmpd), the comparator 33 sets the enable signal (cken) of the clock to "L", and sets the enable signal (cken) to "H" when the output value of the second counter 32 is not less than the comparison value (cmpd) and when the output of the first counter "overflow" is at "L", which is a disenable state. Note that the relationship of the height of the comparison values and the voltage levels of the enable signal (cken) may be inverse.

Based on the enable signal (cken) of the clock, the latch 15 and the AND gate 16 stop the clock (clk) when the voltage level is "L", supply the clock (clk) at the time of "H", generate an output clock (clk out) and output the same.

FIG. 8 is a table of values of the comparison value (maxd1) of the first counter 31, the comparison value (maxd2) of the second counter 32, and the comparison value (cmpd) of the comparator 33 when a clock of 4 MHz to 32 MHz is input and a frequency having a resolution of 1 MHz is generated.

For example, when a desired frequency value (freq) is 10 MHz, a frequency fi of a clock selected by the clock selection circuit 12 becomes 12 MHz and a one-level lower frequency fj than that becomes 8 MHz. At this time, the comparison value (maxd1) of the first counter 31 output from the control circuit 34 becomes fi/(fi-fj)=12M/(12M-8M)=3, and the comparison value (maxd2) of the second counter 32 is (fi-fj)/$\Delta f$=(12M-8M)/1M=4. The comparison values (maxd1) and (maxd2) specify counter values when respective counters overflow. Also, in this case, the comparison value (cmpd) of the comparator 33 given by the control circuit 34 becomes (12-freq)=2. The comparison value (cmpd) specifies a threshold of a change of an output (enable signal (cken) of the clock) of the comparator 33 with respect to its input (second counter output).

By similar calculation, various comparison values (maxd1), (maxd2) and (cmpd) in other frequencies shown in the table in FIG. 8 are calculated in advance in the control circuit 34.

FIGS. 9A to 9F show waveforms of a clock (clk), a counter value of the first counter, an overflow signal of the first counter, a counter value of the second counter, an output of the comparator (enable signal (chen)) and an output clock (clk_out) when 10 MHz is demanded as a frequency (freq) in the setup in FIG. 8.

Figure 9:
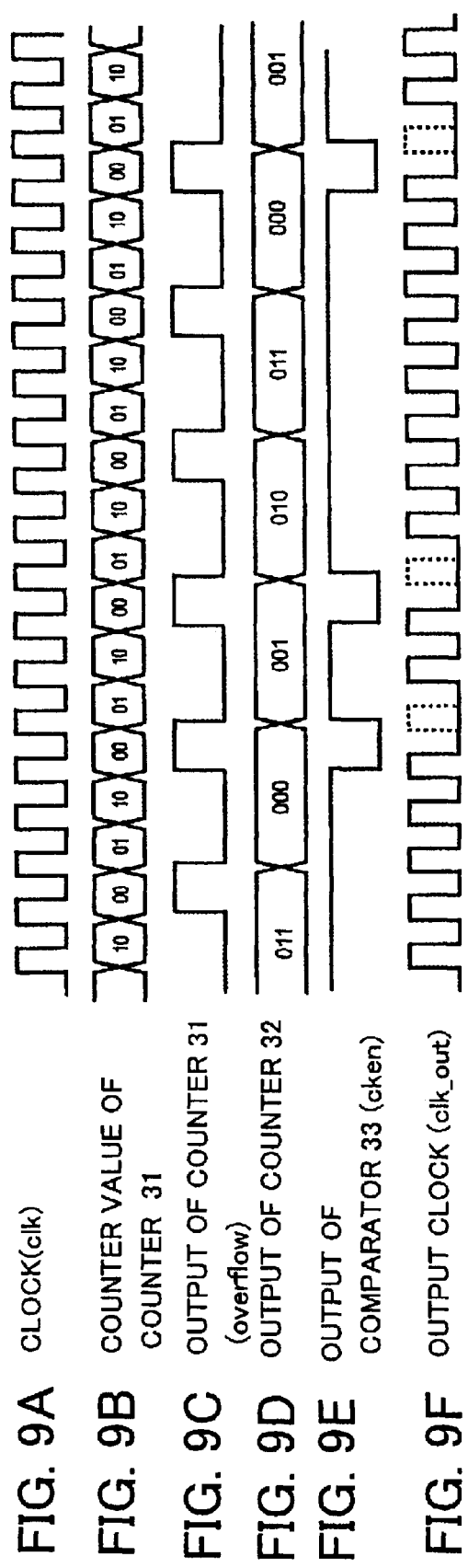
FIG. 9A to FIG. 9F are timing charts showing waveforms of an input/output clock of the output gate, a counter value of the first counter, outputs of the first and second counters and an output of the comparator in an operation of the clock generation circuit according to the third embodiment.

When a frequency of 10 MHz is demanded, a clock (clk_i) of 12 MHz is selected by the clock selection circuit 12 and given as a clock (clk) to the first counter 31, the second counter 32 and the output gate. The first counter 31 operates to count in synchronization with the clock (clk) of 12 MHz. Specifically, when the first counter is an up counter, as shown in FIG. 9B, the first counter 31 endlessly increments between "0" ("00000" in binary) and "2" ("00010" in binary). The second counter 32 operates to count every time the first counter overflows and endlessly increments between "0" ("00000" in binary) and "3" ("00011" in binary) as shown in FIG. 9C and FIG. 9D. The comparator 33 compares the counter value of the second counter 32 with the comparison value (cmpd) by using the overflow signal "overflow" output from the first counter 31 as an enable signal and sets the output to "L" only when the counter value of the second counter 32 is less than the comparison value (cmpd). Here, as shown in FIG. 9E, an output of the comparator 33 becomes "L" only when an overflow signal "overflow" is output from the first counter 31 in periods when an output value of the second counter 32 is "0" ("00000" in binary) and "1" ("00001" in binary). As a result, the clock (clk_out) to be output becomes a clock having an effective frequency of 10 MHz and, as a result, two pulses apart are stopped in every 12 pulses as shown in FIG. 9E.

The case wherein the desired frequency value was 10 MHz was explained as an example above, but in the clock generation circuit 30 of the present embodiment, no matter what value the frequency (freq) may be, a closest frequency is selected in a range larger than that to operate the clock generation circuit. As a result the clock is stopped at a ratio in accordance with a frequency difference, an output clock (clk_out) having an effective frequency equivalent to the desired frequency (freq) can be generated. The power consumption can be suppressed for an amount such that unnecessary clock pulses are not supplied to a system or an electronic apparatus using the clock generation circuit 30.

Particularly, in the third embodiment, the clock (clk_i) is selected in accordance with the demanded frequency (freq) when (clk_j)<(freq)≦(clk_i) is satisfied, at which time the number of clock pulses to be stopped becomes (fi−fj)/Δf which is the maximum among the number of fi/Δf. Accordingly, timings of stopping the clock pulse can be dispersed by generating the (fi−fj)/Δf of pulses in the first counter 31. Consequently, in the same way as in the second embodiment, generation of noise can be suppressed, an erroneous operation of an electronic circuit system or an electronic apparatus can be effectively prevented, and a supply of a clock suitable to an application having real-time characteristics, etc. becomes possible. Furthermore, in the third embodiment, a degree of freedom of adjusting an interval between pulses to be omitted is high due to combinations of a plurality of counters.

Fourth Embodiment

A fourth embodiment involves a case of adding a conversion circuit of a counter value of the counter to the clock generation circuit in the third embodiment.

Figure 10:
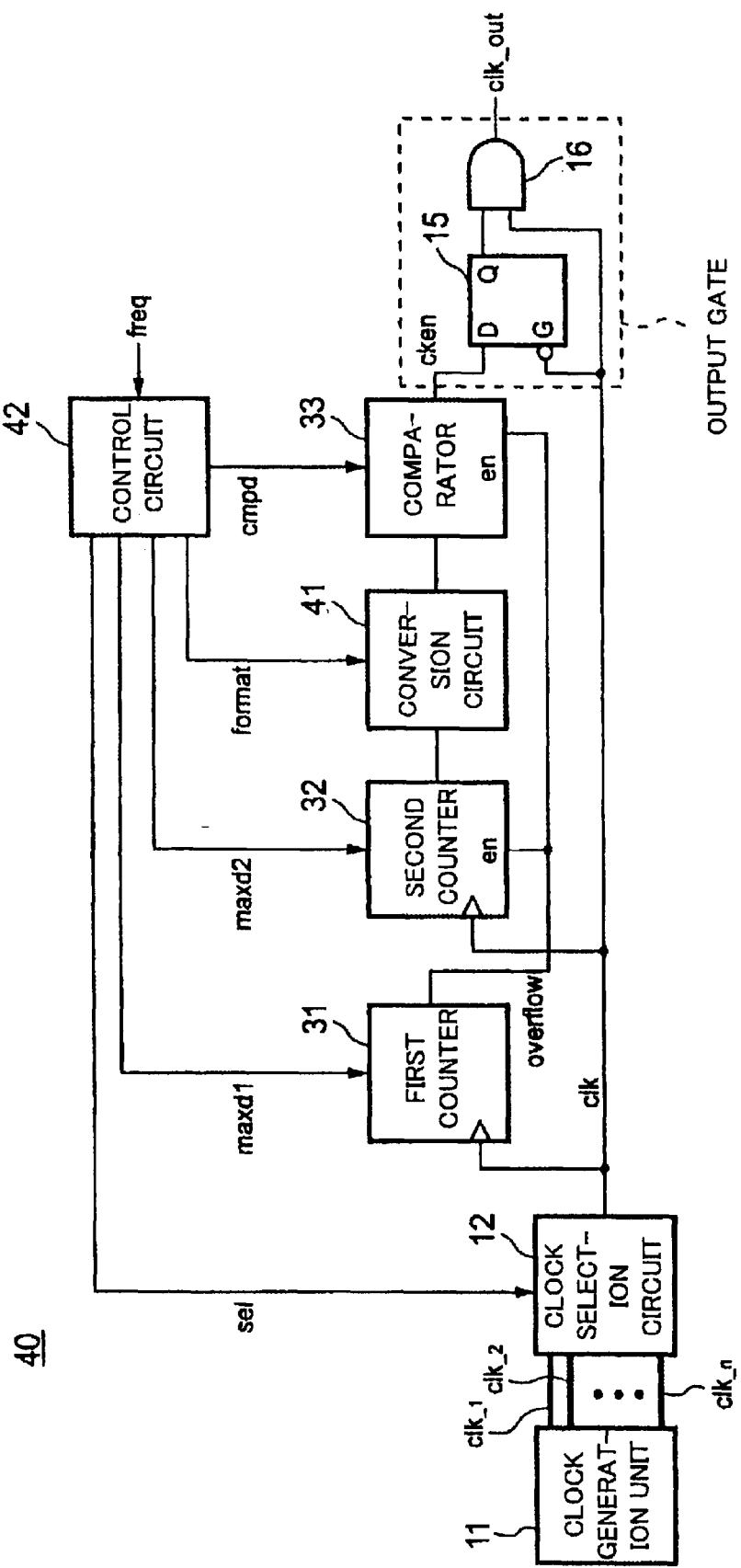
FIG. 10 is a block diagram of the basic configuration of a clock generation circuit according to a fourth embodiment.

FIG. 10 is a block diagram of the basic configuration of a clock generation circuit according to the fourth embodiment. Note that the configurations in common with those in the first and third embodiments are given the same reference numbers and an explanation on functions and connection relationships thereof will be omitted below.

A clock generation circuit 40 comprises a conversion circuit 41 of a clock counter value and a control circuit 42 in addition to a clock generation unit 11, a clock selection circuit 12, an output gate comprising a latch 15 and an AND gate 16, a first counter 31, a second counter 32 and a comparator 33. The control circuit 42 receives as an input a demanded frequency value (freq) of a clock, calculates a selection signal (sel) for instructing to the clock selection circuit 12, a comparison value (maxd1) for instructing to the first counter 31, a comparison value (maxd2) for instructing to the second counter 32, and a comparison value (cmpd) for instructing to the comparator 33 based on the frequency value (freq) and instructs a conversion formula "format" to the conversion circuit 41 in a changeable way.

The conversion circuit 41 of a clock counter value is provided between the second counter 32 and the comparator 33, performs predetermined data conversion on a counter value of the second counter 32 based on conversion regulation, for example a conversion formula "format", given by the control circuit 42, then, outputs the converted value to the comparator 33. Note that when the conversion regulation is fixed to a predetermined one, the conversion circuit itself may be configured in accordance with the conversion regulation and may be configured so that a change of the conversion regulation itself is not possible. In this case, the control circuit 42 may be configured to omit a function of determining conversion regulation, such as a conversion formula "format", that is, configured to be the same configuration as the control circuit 34 in the third embodiment.

The comparator 33 compares the comparison value (cmpd) instructed from the control circuit 42 with the value converted in the conversion circuit 41 by using a signal "overflow" output from the first counter 31 as an enable signal and generates an enable signal (cken) of the clock based on the comparison result.

When a plurality of clocks are input to the clock selection circuit 12, frequencies of the input clocks clk_1, clk_2, ... clk_n are assumed to be f1, f2, ... fn (f1<f2< ... <fn), respectively. When a resolution of a clock frequency demanded to the clock generation circuit 40 is Δf and a frequency of a clock by which a frequency difference of the frequency and that of a clock having a one-level lower frequency (fi−(fi−1)) becomes maximum is assumed f(max), the comparator 33 is a comparator having a bit length of $\log_2(f(max)-f(max-1)/\Delta f)$, the second counter 32 is a counter having $\log_2(f(max)-f(max-1)/\Delta f)$ bits, and the first counter 31 is a counter having $\log_2(f(max)/(f(max)-f(max-1)))$ bits. Also, the conversion circuit 41 performs data conversion of $\log_2(f(max)-f(max-1)/\Delta f)$ bits.

Below, an operation will be explained plainly by taking an example of selecting one out of a plurality of clocks.

When a demanded frequency value (freq) is given, the control circuit 42 outputs to the clock selection circuit 12 a selection signal (sel) for selecting a clock (clk_i) having a minimum frequency fi in a range larger than the demanded frequency value (freq) from the frequencies f1, f2, ... fn of the clocks clk_1, clk_2, ..., clk_n input to the clock selection circuit 12. When assuming that a clock having a one-level lower frequency than that of the clock (clk_i) is (clk_j) and the frequency is fj, the control circuit 42 respectively generates (fi−fj)/Δf as a comparison value (maxd2) of the second counter 32, fi/(fi−fj) as a comparison value (maxd1) of the first counter 31 and (fi−freq)/Δf as a comparison value (cmpd) of the comparator 33 and outputs to the second counter 32, the first counter 31 and the comparator 33, respectively.

As a result, the clock selection circuit 12 selects a clock (clk_i) being in accordance with the desired frequency (freq) indicated by the selection signal (sel).

The first counter 31 endlessly increments or decrements in synchronization with the clock (clk) a counter value between 0 and (maxd1−1) in accordance with the comparison value (maxd1) given by the control circuit 42. The first counter 31 supplies a signal "overflow" to the second counter 32 and the comparator 33 every time an overflow occurs.

The second counter 32 endlessly increments or decrements in synchronization with the clock (clk) a counter value between 0 and (maxd2−1) in accordance with the comparison value (maxd2) given from the control circuit 42 by using the output "overflow" of the first counter 31 as an enable signal.

The conversion circuit 41 performs data conversion on a counter value of the second counter 32 based on a conversion formula "format" given by the control circuit 42. The data conversion is preferably conversion wherein an input value and an output value are determined in one to one correspondence and the maximum value and the minimum value are the same, for example, conversion of replacing bits on the lower bit side in binary, etc.

The comparator 33 compares the converted value input from the conversion circuit 41 with the comparison value (cmpd) by using the output "overflow" of the first counter 31 as an enable signal and sets an enable signal (cken) of the clock to "L" or "H" in accordance with the comparison result. Specifically, the comparator 33 sets the enable signal (cken) of the clock to "L" when the output value of the conversion circuit 41 is less than the comparison value (cmpd), and sets the enable signal (cken) of the clock to "H" when the output value of the conversion circuit 41 is not less than the comparison value (cmpd) and when the output of the first counter "overflow" is at "L", which is a disenable state. Note that the relationship of the height of the comparison values and the voltage levels of the enable signal (cken) may be inverse.

Based on the enable signal (cken) of the clock, the latch 15 and the AND gate 16 stop the clock (clk) when the voltage level is at "L" and supply the clock (clk) when at "H", and generate and output an output clock (clk_out).

FIG. 11 is a table of values of the comparison value (maxd1) of the first counter 31, the comparison value (maxd2) of the second counter 32, a conversion formula "format" of the conversion circuit 41 and the comparison value (cmpd) of the comparator 33 when a clock of 4 MHz to 32 MHz is input and a frequency having a resolution of 1 MHz is generated.

As the conversion formula "format", conversion of replacing all bits or any bits on the lower bit side, such as conversion of replacing all bits from the uppermost bit to the lowermost bit for example as shown in the rows of a clock frequency of 32 MHz and 24 MHz or conversion of replacing bits of the lower two bits for example as shown in the rows of a clock frequency of 16 MHz or less. Of course, the same conversion regulation may be used for all frequencies or different conversion regulation may be used for different frequencies as in the table. Also, the conversion regulation itself may be suitably changed by the control circuit 42.

Note that the various comparison values (maxd1), (maxd2) and (cmpd) for each frequency are calculated in the control circuit 42 in advance in the same way as in the third embodiment.

FIGS. 12A to 12G show waveforms of a clock (clk), a counter value of the first counter, an overflow signal of the first counter, a counter value of the second counter, an output of the comparator (enable signal (chen)) and an output clock (clk_out) when 10 MHz is demanded as a desired frequency (freq) in the setup shown in FIG. 11.

When the desired frequency value (freq) is 10 MHz, a frequency fi of a selected clock becomes 12 MHz and a one-level lower frequency fj becomes 8 MHz. At this time, the comparison value (maxd1) of the first counter 31 is specified to be fi/(fi−fj)=12M/(12M−8M)=3. Accordingly, as shown in FIG. 12B and FIG. 12C, the first counter 31 endlessly increments or decrements three counter values from "0" to "2" (from "00000" to "00010" in binary) and outputs an overflow signal "overflow" every time the counter value is reset.

The comparison value (maxd2) of the second counter 32 is specified to be (fi−fj)/Δf=(12M−8M)/1M=4. Accordingly, as shown in FIG. 12D, the second counter 32 endlessly increments or decrements four counter values from "0" to "3" (from "00000" to "00011" in binary).

The conversion circuit 41 converts the counter value of the second counter 32 in binary based on the data conversion formula "format". In this example, it is the conversion of replacing the lower two bits as shown in FIG. 11, so a counter value of the second counter is rearranged as shown in FIG. 12D to FIG. 12E and output from the conversion circuit 41.

On the other hand, since the comparison value (cmpd) of the comparator 33 is (12-freq)=2, the comparator 33 sets the enable signal (cken) of the clock of the output to "L" only in a period where an overflow signal "overflow" is output from the first counter 31 among periods where an output value of the second counter 32 is "0" ("00000" in binary) and "1" ("00001" in binary) (the periods indicated by a broken line in FIG. 12F). Consequently, the output clock (clk_out) becomes a clock having an effective frequency of 10 MHz and, as a result, two pulses apart are stopped in every 12 pulses as shown in FIG. 12G.

The example wherein a demanded frequency (freq) was 10 MHz was explained above, but in the clock generation circuit 40 of the present embodiment, no matter what value the frequency (freq) may be, a closest frequency is selected from a range larger than that to operate the clock generation circuit. Also, because the clock is stopped at a ratio in accordance with the frequency difference, an output clock (clk_out) having an effective frequency equivalent to the desired frequency (freq) can be generated. Thus, the power consumption can be suppressed for an amount such that unnecessary clock pulses are not supplied to a system or an electronic apparatus using the clock generation circuit 40.

Particularly, in the fourth embodiment, the pulse stopping operations clustered in the former half of a 12-pulse clock cycle (in the latter half in a case of using a down counter) in the third embodiment can be uniformly dispersed as a whole, so more improved clock generation circuit can be realized. In the above first, second, third and fourth embodiments of the present invention, the case of inputting a plurality of clocks clk_1, clk_2, .. clk_n was mainly explained, but the present invention can be applied to the case of single clock. Note that when a plurality of clocks are input, the effect of dispersing the timings of omitting some pulses becomes higher when two counters are used as described in the third and fourth embodiments.

Also, the desired frequency (freq) was given from the outside in the above embodiments, but the present invention is not limited to this and for example it may be configured such that the frequencies are made to be a table for each task and held in the control circuit.

According to a clock generation circuit and a clock conversion circuit according to the present invention, a clock having a multi-level effective frequency can be generated in accordance with a desired frequency, as a result, it becomes possible to always supply a clock having a required minimum frequency corresponding to a required task, etc. Thus, the power consumption of a system or an apparatus using this circuit can be reduced.

Also, by adding a conversion circuit, two counters, or a combination of them, the timings of stopping clock pulses are dispersed, so generation of power source noise at a low frequency is suppressed and real-time characteristics of a system, etc. is not deteriorated. Particularly, by combining the conversion circuit and two counters, an ideal clock pulse wherein stopping periods of pulses are uniformly dispersed as a whole can be generated.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A clock generation circuit, comprising:
   a clock generation unit for generating a clock with a constant frequency;
   a first counter for counting in synchronization with said clock;
   a second counter for counting in synchronization with said clock every time said first counter overflows;
   a comparator for comparing the counter value of said second counter with a value corresponding to a frequency difference between a frequency of said clock and a desired frequency; and
   an output gate for controlling the supply and stopping of pulses of said clock based on a comparison result of said comparator and outputting a clock whose frequency has become the same as the desired frequency.

2. A clock generation circuit as set forth in claim 1, wherein said clock generation unit generates a plurality of clocks having a constant frequency respectively;

further comprising a selection circuit for receiving said plurality of clocks, selecting one among them, and supplying the selected clock to the first counter and said output gate.

3. A clock generation circuit as set forth in claim 2, further comprising a means for selecting a clock from said plurality of clocks, counter values of said first counter and said second counter, and a comparison standard for said comparator to compare with the counter values of said counters in accordance with said desired frequency.

4. A clock generation circuit, comprising:

a clock generation unit for generating a clock with a constant frequency;

a first counter for counting in synchronization with said clock;

a second counter for counting in synchronization with said clock every time said first counter overflows;

a conversion circuit for performing data conversion on a counter value of said second counter and outputting the same;

a comparator for comparing an output value of said conversion circuit with a value corresponding to a frequency difference between a frequency of said clock and a desired frequency every time said first counter overflows; and an output gate for controlling the supply and stopping of pulses of said clock based on a comparison results of said comparator and outputting a clock whose frequency has become the same as the desired frequency.

5. A clock generation circuit as set forth in claim 4, wherein said clock generation unit generates a plurality of clocks having a constant frequency respectively;

further comprising a selection circuit for selecting a clock from said plurality of clocks, and supplying the selected clock to said first counter and said output gate.

6. A clock generation circuit as set forth in claim 5, further comprising a control circuit for controlling a frequency of a clock that said selection circuit selects, counter values of said fast counter and said second counter, and a comparison standard for said comparator to compare with counter values of said counters in accordance with said desired frequency.

7. A clock generation circuit as set forth in claim 5, further comprising a control circuit for changing conversion regulation by said conversion circuit in accordance with said desired frequency.

8. A clock conversion circuit, comprising:

a first counter for counting in synchronization with a clock;

a second counter for counting in synchronization with said clock every time said first counter overflows;

a comparator for comparing a counter value of said second counter with a value corresponding to a frequency difference between a frequency of said clock and a desired frequency; and an output gate for controlling the supply and stopping of pulses of said clock based on a comparison result of said comparator and outputting a clock whose frequency has become the same as the desired frequency.

9. A clock conversion circuit, comprising:

a first counter for counting in synchronization with a clock;

a second counter for counting in synchronization with said clock every time said first counter overflows;

a conversion circuit for performing data conversion on the counter value of said second counter and outputting the same;

a comparator for comparing an output value of said conversion circuit with a value corresponding to a frequency difference between a frequency of said clock and a desired frequency; and an output gate for controlling the supply and stopping of pulses of said clock based on a comparison result of said comparator and outputting a clock whose frequency has become the same as the desired frequency.

* * * * *

UNITED STATES PATENT AND TRADEMARK OFFICE
CERTIFICATE OF CORRECTION

PATENT NO. : 6,784,716 B2
DATED : August 31, 2004
INVENTOR(S) : Tetsumasa Meguro It is certified that error appears in the above-identified patent and that said Letters Patent is hereby corrected as shown below:

<u>Column 18,</u>
Line 2, "fast" should read -- first --.

Signed and Sealed this

First Day of February, 2005

JON W. DUDAS
*Director of the United States Patent and Trademark Office*